United States Patent
Kobayashi et al.

(10) Patent No.: US 12,542,245 B2
(45) Date of Patent: Feb. 3, 2026

(54) ELECTROLYTIC CAPACITOR

(71) Applicant: Panasonic Intellectual Property Management Co., Ltd., Osaka (JP)

(72) Inventors: Takehiro Kobayashi, Osaka Fu (JP); Hiroyuki Arima, Osaka Fu (JP); Yasuhiro Nishimura, Hyogo Ken (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 198 days.

(21) Appl. No.: 18/258,759

(22) PCT Filed: Dec. 28, 2021

(86) PCT No.: PCT/JP2021/048821
§ 371 (c)(1),
(2) Date: Jun. 21, 2023

(87) PCT Pub. No.: WO2022/145452
PCT Pub. Date: Jul. 7, 2022

(65) Prior Publication Data
US 2024/0047140 A1 Feb. 8, 2024

(30) Foreign Application Priority Data

Dec. 28, 2020 (JP) ................. 2020-218307

(51) Int. Cl.
*H01G 9/145* (2006.01)
*H01G 9/025* (2006.01)
(Continued)

(52) U.S. Cl.
CPC ............ *H01G 9/025* (2013.01); *H01G 9/035* (2013.01); *H01G 9/145* (2013.01); *H01G 9/15* (2013.01)

(58) Field of Classification Search
CPC ............ H01G 9/28; H01G 9/15; H01G 9/145; H01G 9/035; H01G 9/025
See application file for complete search history.

(56) References Cited

U.S. PATENT DOCUMENTS

2011/0242730 A1* 10/2011 Zhou ................. H01G 11/02
427/80
2014/0092529 A1 4/2014 Nobuta et al.
(Continued)

FOREIGN PATENT DOCUMENTS

JP H07-283086 A 10/1995
JP 2003-173932 A 6/2003
(Continued)

OTHER PUBLICATIONS

International Search Report dated Mar. 22, 2022 issued in International Patent Application No. PCT/JP2021/048821, with English translation.

*Primary Examiner* — David M Sinclair
(74) *Attorney, Agent, or Firm* — Rimon P.C.

(57) ABSTRACT

A disclosed electrolytic capacitor includes a capacitor element. The capacitor element includes an anode body, a dielectric layer formed on a surface of the anode body, a cathode body, and an electrolyte layer and a separator that are disposed between the dielectric layer and the cathode body. The electrolyte layer includes a non-aqueous solvent and conductive particles. A ratio D/T of an average maximum diameter D of the conductive particles to an average thickness T of the separator is in a range of 0.01 to 0.9.

14 Claims, 1 Drawing Sheet

(51) Int. Cl.
*H01G 9/035* (2006.01)
*H01G 9/15* (2006.01)

(56) References Cited

U.S. PATENT DOCUMENTS

| | | | |
|---|---|---|---|
| 2016/0172117 A1 | 6/2016 | Kubo et al. | |
| 2018/0108490 A1 | 4/2018 | Kubo et al. | |
| 2019/0096589 A1* | 3/2019 | Chen | ................. H01G 9/028 |
| 2023/0078283 A1* | 3/2023 | Arima | ................. H01G 9/0036 |
| | | | 361/525 |

FOREIGN PATENT DOCUMENTS

| | | | | |
|---|---|---|---|---|
| JP | 2005085947 A | * | 3/2005 | ............. H01G 11/48 |
| JP | 2013-191780 A | | 9/2013 | |
| JP | 2016-143752 A | | 8/2016 | |
| JP | 2020-005003 A | | 1/2020 | |
| WO | 2012/117994 A1 | | 9/2012 | |
| WO | WO-2016077129 A1 | * | 5/2016 | ............... H01G 9/02 |

* cited by examiner

ELECTROLYTIC CAPACITOR

CROSS-REFERENCE OF RELATED APPLICATIONS

This application is the U.S. National Phase under 35 U.S.C. § 371 of International Patent Application No. PCT/JP2021/048821 filed on Dec. 28, 2021, which in turn claims the benefit of Japanese Patent Application No. 2020-218307 filed on Dec. 28, 2020, the entire disclosures of which Applications are incorporated by reference herein.

TECHNICAL FIELD

The present disclosure relates to an electrolytic capacitor.

BACKGROUND ART

Capacitors for use in electronic devices are required to have a high capacity and a low value of an equivalent series resistance (ESR) in a high frequency range. If ESR is large, various problems occur. For example, when a ripple current flows, the amount of heat proportional to the ESR is generated, and the generated heat causes a reduction in the characteristics of the conductive polymer.

One promising high-capacity and low-ESR capacitor is an electrolytic capacitor that uses a conductive polymer such as polypyrrole, polythiophene, polyfuran, and polyaniline. PTL 1 (WO 2012/117994) discloses, as a conductive polymer solution for forming a solid electrolyte layer, "A conductive polymer solution, comprising a conductive polymer, a polysulfonic acid or a salt thereof which functions as a dopant to the conductive polymer, a mixture of a polyacid and a carbon material, and a solvent" (Claim 1 of PTL 1). In addition, PTL 1 discloses a solid electrolytic capacitor manufactured using the conductive polymer solution.

CITATION LIST

Patent Literature

[PTL 1] WO 2012/117994

SUMMARY OF INVENTION

Technical Problem

Currently, there is a need for an electrolytic capacitor having a low rate of increase in ESR over a long period of time. Under such a circumstance, an object of the present disclosure is to provide an electrolytic capacitor having a low rate of increase in ESR over a long period of time.

Solution to Problem

An aspect of the present disclosure relates to an electrolytic capacitor. The electrolytic capacitor is an electrolytic capacitor including a capacitor element, wherein the capacitor element includes an anode body, a dielectric layer formed on a surface of the anode body, a cathode body, and an electrolyte layer and a separator that are disposed between the dielectric layer and the cathode body, the electrolyte layer includes a non-aqueous solvent and conductive particles, and a ratio D/T of an average maximum diameter D of the conductive particles to an average thickness T of the separator is in a range of 0.01 to 0.9.

Advantageous Effects of Invention

According to the present disclosure, it is possible to obtain an electrolytic capacitor having a low rate of increase in ESR over a long period of time.

While the novel features of the invention are set forth in the appended claims, the invention, both as to organization and content, will be better understood and appreciated, along with other objects and features thereof, from the following detailed description taken in conjunction with the drawings.

DESCRIPTION OF EMBODIMENTS

Figure 1:
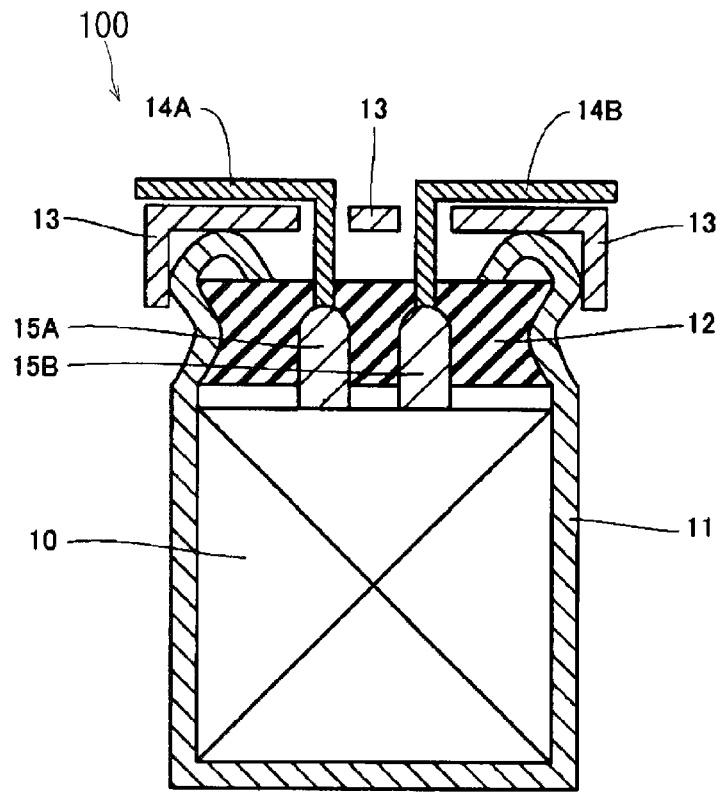
FIG. 1 is a cross-sectional view schematically showing an exemplary electrolytic capacitor according to the present disclosure.

In the following, embodiments of the present disclosure will be described by way of examples. However, the present disclosure is not limited to the examples described below. Although examples of specific numerical values and materials may be given in the following description, other numerical values and materials may be used as long as the effects of the present disclosure can be achieved. In this specification, by "from numerical value A to numerical value B", it is meant that the range includes the numerical value A and the numerical value B.

(Electrolytic Capacitor)

An electrolytic capacitor according to the present embodiment includes a capacitor element. The capacitor element includes an anode body, a dielectric layer formed on a surface of the anode body, a cathode body, and an electrolyte layer and a separator that are disposed between the dielectric layer and the cathode body. The electrolyte layer includes a non-aqueous solvent and conductive particles. A ratio D/T of an average maximum diameter D ($\mu$m) of the conductive particles to an average thickness T ($\mu$m) of the separator is in a range of 0.01 to 0.9.

The conductive particles undergo substantially no degradation due to heat. For this reason, by adding the conductive particles to the electrolyte layer, it is possible to suppress an increase in ESR over a long period of time. By setting the ratio D/T to 0.9 or less, a short circuit associated with the conductive particles can be suppressed. By setting the ratio D/T to 0.01 or more, ESR can be particularly reduced.

The average thickness T of the separator can be measured using a constant-pressure thickness measuring instrument compliant with JIS P 8118.

The average maximum diameter D of the conductive particles can be measured by the following method. First, an image of the interior of the electrolyte layer or the top of the separator is captured using a device (an optical microscope, an electron microscope, etc.) capable of performing image capturing at a magnification of greater than or equal to 100× and identifying the shapes of particles. The maximum diameter of the particles is measure by subjecting the resultant image to image processing. The maximum diameter is measured for 10 arbitrarily selected particles, and the arithmetic average thereof is determined as the average maximum diameter D. Unless there is any particular problem, the average maximum diameter D is measured using this method. As another method, the volume-based particle size distribution may be measured using sieving, light scattering, or precipitation, and a $D_{90}$ diameter at which a cumulative volume is 90% may be determined as the average maximum diameter D.

The electrolytic capacitor according to the present embodiment may satisfy the following condition (1), and may further satisfy the conditions (2) and/or (3). By satisfying the conditions (1), (2), and (3), an increase in ESR can be particularly suppressed over a long period of time.

(1) The above-described ratio D/T is in the range of 0.01 to 0.9. The ratio D/T may be in the range of 0.01 to 0.5 (e.g., the range of 0.01 to 0.33). When the aspect ratio of the conductive particles is 3 or more, the ratio D/T may be in the range of 0.1 to 1.0.

(2) The average thickness T of the separator is in the range of 10 μm to 200 μm (e.g., the range of 20 μm to 100 μm).

(3) The average maximum diameter D of the conductive particles is in the range of 0.1 μm to 180 μm (e.g., the range of 0.2 μm to 90 μm).

The capacitor element may include a foil-shaped anode body having a dielectric layer on a surface thereof, a foil-shaped cathode body, and a separator and an electrolyte layer that are disposed between the anode body (more specifically, the dielectric layer) and the cathode body. The capacitor element may be a wound capacitor element or a stacked capacitor element. In an exemplary wound capacitor element, the foil-shaped anode body, the foil-shaped cathode body, and the separator are wound such that the separator is disposed between the anode body and the cathode body. In an exemplary stacked capacitor element, the foil-shaped anode body, the foil-shaped cathode body, and the separator are folded in a zigzag fashion such that the separator is disposed between the anode body and the cathode body.

The electrolytic capacitor according to the present embodiment may satisfy the following condition (4), and may further satisfy the condition (5). By using these configurations, the effects described below can be achieved.

(4) The electrolyte layer further includes a conductive polymer.

(5) The electrolyte layer includes a dopant of the conductive polymer. The dopant may be a polymeric dopant containing an acidic group. In that case, the electrolyte layer may include an electrolytic solution including a non-aqueous solvent and a base component dissolved in the non-aqueous solvent. In that case, the content of the base component in the electrolytic solution may be 0.1 mass % or more and 20 mass % or less.

By using the conductive polymer including the dopant, it is possible to increase the conductivity of the electrolyte layer. Examples of the conductive polymer and the dopant will be described below.

The mass of the conductive particles included in the electrolyte layer may be larger than a total mass of the conductive polymer and the dopant included in the electrolyte layer. With this configuration, an increase in ESR can be particularly suppressed. A total content M (mass %) of the conductive polymer and the dopant in the electrolyte layer and a content N (mass %) of the conductive particles in the electrolyte layer may satisfy M<N. Also, 0.1<N may be satisfied, or 0.05<M may be satisfied.

A ratio N/M, which is the ratio between the content N of the conductive particles and a total content M of the conductive polymer and the dopant, may be in the range of 25/75 to 75/25. By using this range, an electrolytic capacitor having excellent characteristics can be obtained.

The conductive particles may be conductive inorganic particles. The conductive particles may be particles of a conductive carbon material. For example, the conductive particles may include at least one selected from the group consisting of particles of carbon black, particles of carbon nanotube, particles of graphite, and particles of graphene. These particles are preferable in that their average particle size, the structure between particles, and the surface properties can be controlled in various manners. The conductive particles may be composed only of one type of particles of these particles, or may be composed of a plurality of types of particles of these particles.

The conductive particles may have a spherical shape or a flaky shape. The type of conductive particles having a flaky shape is not particularly limited, and the conductive particles may be flaky particles made of a conductive carbon material. For example, graphite and graphene can easily take a flaky form, and flaky particles thereof are readily available. By using flaky particles, it is possible to achieve effects such as increasing the conductivity of the electrolyte layer, increasing the affinity between the electrolyte or the separator and the conductive particles, and suppressing the uneven distribution of the conductive particles in the electrolyte and the separator.

The average aspect ratio of the flaky carbon particles may be 2 or more, or 3 or more. The average aspect ratio of the carbon particles can be determined in the following manner. First, an image of carbon particles is obtained using a Scanning Electron Microscope (SEM). In the obtained SEM image, a plurality of (e.g., 10) carbon particles are arbitrarily selected. Next, for the selected carbon particles, a maximum diameter D1 is measured, and a maximum diameter D2 in a direction orthogonal to the maximum diameter D1 is further measured. For each of the carbon particles, a ratio D1/D2 of D1 to D2 is determined as an aspect ratio, and the aspect ratios of the carbon particles are arithmetically averaged, whereby an average aspect ratio is determined.

The conductive particles may have a whisker (rod) shape. By using whisker-shaped particles, it is possible to achieve effects such as increasing the conductivity of the electrolyte layer, increasing the affinity between the electrolyte or the separator and the conductive particles, and suppressing the uneven distribution of the conductive particles in the electrolyte and the separator.

The type of conductive particles having a whisker shape is not particularly limited, and the conductive particles may be particles made of a conductive carbon material, or particles made of another inorganic material. For example, the conductive particles having a whisker shape may be carbon nanotubes or carbon nanofibers. Alternatively, the conductive particles may be particles obtained by covering whisker-shaped inorganic particles (e.g., glass fibers) with a conductive metal (e.g., a conductive alloy).

In a preferred example, the cathode body is a conductive foil, and the conductive particles are metal particles. When the cathode body is a conductive foil (e.g., a metal foil), the contact resistance between the conductive polymer and the cathode body may increase. However, when the cathode body is a conductive foil (e.g., a metal foil) and the conductive particles are metal particles, the contact resistance therebetween can be reduced. Accordingly, the ESR of the electrolytic capacitor can be particularly reduced.

Except for portions that are characteristic to the electrolytic capacitor according to the present disclosure, the constituent members of the electrolytic capacitor according to the present disclosure are not particularly limited, and known constituting members may be used. Exemplary constituent members of the electrolytic capacitor according to the present disclosure will now be described.

(Electrolyte Layer)

The electrolyte layer is disposed between and in contact with the dielectric layer and the cathode body. That is, the region between the dielectric layer and the cathode body constitutes the region of the electrolyte layer. As described above, the electrolyte layer includes the non-aqueous solvent and the conductive particles, and may further include a conductive polymer.

(Conductive Polymer)

The conductive polymer included in the electrolyte layer will now be described. In this specification, a conductive polymer ("doudensei kobunshi" in Japanese) may be read as a conductive polymer ("doudensei porima" in Japanese).

Examples of the conductive polymer include polypyrrole, polythiophene, polyfuran, polyaniline, polyacetylene, and derivatives thereof. The derivatives include polymers including polypyrrole, polythiophene, polyfuran, polyaniline, and polyacetylene, respectively, as basic skeletons. For example, the derivatives of polythiophene include poly(3,4-ethylenedioxythiophene). These conductive polymers may be used alone, or a plurality of them may be used in combination. The conductive polymer may be a copolymer of two or more monomers. The weight-average molecular weight of the conductive polymer is not particularly limited, and may be in the range of 1000 to 100000, for example. A preferred example of the conductive polymer is poly(3,4-ethylenedioxythiophene) (PEDOT).

Preferably, the conductive polymer is doped with a dopant. From the viewpoint of suppressing dedoping from the conductive polymer, it is preferable to use a polymeric dopant as the dopant. Examples of the polymeric dopant include polyvinylsulfonic acid, polystyrenesulfonic acid, polyallylsulfonic acid, polyacrylicsulfonic acid, polymethacrylsulfonic acid, poly(2-acrylamide-2-methylpropanesulfonate), polyisoprenesulfonic acid, and poly(acrylic acid). These may be used alone or in combination of two or more. These may be included in the form of a salt in the electrolyte layer. A preferred example of the dopant is polystyrenesulfonic acid (PSS). As in the case of the above-described example, the conductive polymer and the dopant are typically separate molecules. However, the conductive polymer may be a self-doping conductive polymer including an atomic group (e.g., a sulfonic acid group) that functions as a dopant.

The weight-average molecular weight of the dopant is not particularly limited. From the viewpoint of facilitating formation of a homogeneous electrolyte layer, the weight-average molecular weight of the dopant may be in the range of 1000 to 100000.

In the electrolytic capacitor according to the present disclosure, the dopant may be polystyrenesulfonic acid, and the conductive polymer may be poly(3,4-ethylenedioxythiophene). That is, the electrolyte layer may include poly(3,4-ethylenedioxythiophene) doped with polystyrenesulfonic acid.

(Liquid Component)

The electrolyte layer of the electrolytic capacitor according to the present disclosure includes a non-aqueous solvent. The electrolyte layer may include an electrolytic solution (non-aqueous electrolytic solution) including a non-aqueous solvent and a base component dissolved in the non-aqueous solvent. That is, the electrolyte layer of the electrolytic capacitor according to the present disclosure may include a liquid component. In the following, the liquid component (non-aqueous solvent or electrolytic solution) included in the electrolyte layer may be referred to as a "liquid component (L)". In this specification, the liquid component (L) may be a component that is liquid at room temperature (25° C.), or a component that is liquid at a temperature at which the electrolytic capacitor is used. The electrolytic capacitor having an electrolyte layer including the liquid component (L) may be called a hybrid capacitor.

The non-aqueous solvent included in the electrolyte layer may be an organic solvent, or an ionic liquid. Examples of the non-aqueous solvent include polyhydric alcohols such as ethylene glycol and propylene glycol, cyclic sulfones such as sulfolane (SL), lactones such as γ-butyrolactone (γBL), amides such as N-methylacetamide, N,N-dimethylformamide, and N-methyl-2-pyrrolidone, esters such as methyl acetate, carbonate compounds such as propylene carbonate, ethers such as 1,4-dioxane, ketones such as methyl ethyl ketone, and formaldehyde.

Also, a polymeric solvent may be used as the non-aqueous solvent. Examples of the polymeric solvent include polyalkylene glycol, a derivative of polyalkylene glycol, and a compound obtained by substituting at least one hydroxyl group of polyhydric alcohol with polyalkylene glycol (including a derivative). Specific examples of the polymeric solvent include polyethylene glycol (PEG), polyethylene glycol glyceryl ether, polyethylene glycol diglyceryl ether, polyethylene glycol sorbitol ether, polypropylene glycol, polypropylene glycol glyceryl ether, polypropylene glycol diglyceryl ether, polypropylene glycol sorbitol ether, and polybutylene glycol. Further examples of the polymeric solvent include an ethylene glycol-propylene glycol copolymer, an ethylene glycol-butylene glycol copolymer, and a propylene glycol-butylene glycol copolymer. The non-aqueous solvents may be used alone, or two or more of them may be used as a mixture.

As described above, the electrolyte layer may include a non-aqueous solvent, and a base component (base) dissolved in the non-aqueous solvent. Also, the electrolyte layer may include a non-aqueous solvent, and a base component and/or an acid component (acid) dissolved in the non-aqueous solvent.

As the acid component, it is possible to use polycarboxylic acid and monocarboxylic acid. Examples of the polycarboxylic acid include aliphatic polycarboxylic acid ([saturated polycarboxylic acid, including, for example, oxalic acid, malonic acid, succinic acid, glutaric acid, adipic acid, pimelic acid, suberic acid, azelaic acid, sebacic acid, 1,6-decane dicarboxylic acid, and 5,6-decane dicarboxylic acid]; [unsaturated polycarboxylic acid, including, for example, maleic acid, fumaric acid, icotanic acid]), aromatic polycarboxylic acid (e.g., phthalic acid, isophthalic acid, terephthalic acid, trimellitic acid, and pyromellitic acid), and alicyclic polycarboxylic acid (e.g., cyclohexane-1,2-dicarboxylic acid and cyclohexene-1,2-dicarboxylic acid, etc.)

Examples of the above-described monocarboxylic acid include aliphatic monocarboxylic acid (with 1 to 30 carbon atoms) ([saturated monocarboxylic acid, including, for example, formic acid, acetic acid, propionic acid, butyric acid, isobutyric acid, valeric acid, caproic acid, enanthic acid, caprylic acid, pelargonic acid, lauryl acid, myristic acid, stearic acid, and behenic acid]; [unsaturated monocarboxylic acid, including, for example, acrylic acid, methacrylic acid, and oleic acid]), aromatic monocarboxylic acid (e.g., benzoic acid, cinnamic acid, and naphthoic acid), oxy carboxylic acid (e.g., salicylic acid, mandelic acid, and resorcinol acid).

Among these, maleic acid, phthalic acid, benzoic acid, pyromellitic acid, and resorcinol acid are thermally stable, and can be preferably used.

An inorganic acid may be used as the acid component. Typical examples of the inorganic acid include phosphoric acid, phosphorous acid, hypophosphorous acid, alkyl phosphoric acid ester, boric acid, fluoroboric acid, tetrafluoroboric acid, hexafluorophosphoric acid, benzenesulfonic acid, and naphthalenesulfonic acid. Also, a composite compound of an organic acid and an inorganic acid may be used as the acid component. Examples of such a composite compound include borodiglycolic acid, borodioxalic acid, and borodisalicylic acid.

The base component may be a compound having an alkyl-substituted amidine group, and may be, for example, an imidazole compound, a benzimidazole compound, or an alicyclic amidine compound (a pyrimidine compound or an imidazoline compound). Specifically, 1,8-diazabicyclo[5,4,0]undecene-7, 1,5-diazabicyclo[4,3,0]nonene-5, 1,2-dimethylimidazolinium, 1,2,4-trimethylimidazoline, 1-methyl-2-ethylimidazoline, 1,4-dimethyl-2-ethylimidazoline, 1-methyl-2-heptylimidazoline, 1-methyl-2-(3'heptyl)imidazoline, 1-methyl-2-dodecylimidazoline, 1,2-dimethyl-1,4,5,6-tetrahydropyrimidine, 1-methylimidazole, and 1-methylbenzimidazole are preferable. By using these compounds, a capacitor that exhibits excellent impedance performance can be obtained.

A quaternary salt of a compound having an alkyl-substituted amidine group may be used as the base component. Examples of such a base component include imidazole compounds, benzimidazole compounds, alicyclic amidine compounds (a pyrimidine compound and an imidazoline compound) that are quaternized with an alkyl group or an arylalkyl group each having 1 to 11 carbon atoms. Specifically, it is preferable to use 1-methyl-1,8-diazabicyclo[5,4,0]undecene-7, 1-methyl-1,5-diazabicyclo[4,3,0]nonene-5, 1,2,3-trimethylimidazolinium, 1,2,3,4-tetramethylimidazolinium, 1,2-dimethyl-3-ethylimidazolinium, 1,3,4-trimethyl-2-ethylimidazolinium, 1,3-dimethyl-2-heptylimidazolinium, 1,3-dimethyl-2-(3'heptyl)imidazolinium, 1,3-dimethyl-2-dodecylimidazolinium, 1,2,3-trimethyl-1,4,5,6-tetrahydropyrimidium, 1,3-dimethylimidazolium, 1-methyl-3-ethylimidazolium, and 1,3-dimethylbenzimidazolium. By using these compounds, a capacitor that exhibits excellent impedance performance can be obtained.

Also, tertiary amine may be used as the base component. Examples of the tertiary amine include trialkylamines (e.g., trimethylamine, dimethylethylamine, methyldiethylamine, triethylamine, dimethyl-n-propylamine, dimethylisopropylamine, methylethyl-n-propylamine, methylethylisopropylamine, diethyl-n-propylamine, diethylisopropylamine, tri-n-propylamine, triisopropylamine, tri-n-butylamine, and tri-tert-butylamine) and phenyl group-containing amines (e.g., dimethylphenylamine, methylethylphenylamine, and diethylphenylamine). In particular, trialkylamines are preferable in that the conductivity of the electrolyte layer is increased, and it is more preferable that at least one selected from the group consisting of trimethylamine, dimethylethylamine, methyldiethylamine, and triethylamine is included. Also, a secondary amine such as dialkylamine, a primary amine such as monoalkylamine, or ammonia may be used as the base component.

The liquid component (L) may contain a salt of the acid component and the base component. The salt may be an inorganic salt and/or an organic salt. An organic salt is a salt in which at least one of the anion and the cation contains an organic material. As the organic salt, it is possible to use, for example, trimethylamine maleate, triethylamine borodisalicylate, ethyldimethylamine phthalate, mono 1,2,3,4-tetramethylimidazolinium phthalate, and mono 1,3-dimethyl-2-ethylimidazolinium phthalate.

To suppress dedoping of the dopant, the pH of the liquid component (L) may be less than 7, or 5 or less (e.g., the range of 2 to 4.5).

It is important for an electrolytic capacitor to have low ESR. It is possible to realize low ESR by using an electrolyte layer including a conductive polymer doped with a dopant. However, the present inventors have found that, when an electrolyte layer including a conductive polymer doped with a dopant and a non-aqueous solvent (liquid component (L)) is used, the initial ESR is low, but there is a serious degradation phenomenon in which ESR increases over time. As a result of investigating causes thereof, it has been found that the dopant may be more likely to be dedoped in the electrolyte layer including the liquid component (L). It is considered that this dedoping causes an increase in ESR over time. Therefore, it is important to suppress an increase in ESR over time for an electrolytic capacitor including the liquid component (L), as compared with a solid electrolytic capacitor including a solid electrolyte that does not include the liquid component (L).

The conductive polymer has high conductivity, and is therefore effective in reducing ESR. However, the conductivity of the conductive polymer is reduced by degradation over time, thus causing an increase in ESR. In particular, when the electrolyte layer includes the liquid component (L), the increase in ESR is significant. On the other hand, it is considered that the conductive particles undergo substantially no degradation in conductivity over time. Therefore, adding the conductive particles can suppress an increase in ESR over time.

In the electrolytic capacitor according to the present disclosure, the dopant may be a dopant containing an acidic group, or a polymeric dopant containing an acidic group. As a result of investigations, the present inventors have newly found that, in the case of using a dopant containing an acidic group, a significant dedoping may occur with an increase in pH. Therefore, it is particularly important to suppress an increase in ESR over time in the case of using a dopant containing an acidic group.

In the electrolytic capacitor according to the present disclosure, the dopant may be a polymeric dopant containing an acidic group, and the electrolyte layer may include an electrolytic solution including a non-aqueous solvent and a base component dissolved in the non-aqueous solvent. In this case, the base component is likely to cause dedoping, and it is therefore particularly important to suppress an increase in ESR over time. As described above, the electrolytic capacitor according to the present disclosure includes the conductive particles, and thus can suppress an increase in ESR over time.

Examples of the acidic group include a sulfonic acid group and a carboxyl group. The polymeric dopant containing an acidic group is a polymer in which at least some of the constituent units contain an acidic group. Examples of such a polymeric dopant include the above-described polymeric dopants.

In the electrolytic capacitor according to the present disclosure, the amount of the base component in the electrolytic solution may be 0.1 mass % or more and 20 mass % or less. When the amount of the base component is 0.1 mass % or more, it is particularly important to use the conductive particles. When the amount of the base component is 20 mass % or less, the base component can be easily dissolved in the electrolytic solution.

The content of the liquid component (L) in the electrolyte layer may be in the range of 10 to 99.85 mass % (e.g., the range of 30 to 95 mass %). A total content of the conductive polymer and the dopant in the electrolyte layer may be in the range of 0.05 to 20 mass % (e.g., the range of 1 to 10 mass %). The content of the conductive particles in the electrolyte layer may be in the range of 0.1 to 80 mass % (e.g., the range of 1 to 30 mass %). These contents may be outside the ranges described herein as long as the effects of the present disclosure can be achieved.

(Conductive Particles)

The conductive particles included in the electrolyte layer will now be described. The conductive particles are particles made of a conductive material. Note that the conductive particles are different from the above-described conductive polymer. Typically, the conductive particles are made of a material that is not a polymer.

The conductive particles included in the electrolyte layer may include only one type of conductive particles, or may include a plurality of types of conductive particles. Each of the conductive particles is a particle having conductivity, and a conductive material is present at least on the surface of the particle. The conductive particles may be particles made of a conductive material. The conductive material may be at least one selected from the group consisting of a metal, a conductive carbon material, a conductive oxide, and a metal-plated material. Example of the metal include gold, silver, copper, nickel, and tin. Examples of the conductive carbon material include carbon black, carbon nanotubes, graphite, and graphene. Examples of the conductive oxide include tin oxide, indium oxide, and zinc oxide. Alternatively, the conductive material may be a conductive nickel-phosphorus (Ni—P) material, a conductive indium-tin (In—Sn) material, a conductive tin-silver (Sn—Ag), or the like. The conductive particles may be particles obtained by coating (e.g., coating by metal plating) the surface of glass beads, mica powder, glass fiber, carbon fiber, or the like with any of the above-described conductive materials. The conductive particles may be metal particles, particles of a conductive carbon material, or particles of a conductive oxide.

The average particle size of the conductive particles may be in the range of 0.2 μm to 50 μm (e.g., the range of 2 μm to 20 μm). In this specification, the average particle size of particles refers to a median diameter ($D_{50}$) at a cumulative volume of 50% in a volume-based particle size distribution. The median diameter can be determined using a laser diffraction/scattering particle size distribution measurement device, for example.

(Anode Body)

As the anode body, a metal foil having a dielectric layer formed on a surface thereof may be used. The metal constituting the metal foil is not particularly limited. From the viewpoint of ease of forming the dielectric layer, examples of the metal constituting the metal foil include valve metals such as aluminum, tantalum, niobium, and titanium, and alloys of valve metals. Preferred examples are aluminum and an aluminum alloy. Usually, the surface of the anode body is roughened (made porous). The dielectric layer of the anode body is formed on the porous portion (roughened surface). The electrolyte layer is in contact with the dielectric layer of the anode body.

The dielectric layer formed on the surface of the anode body can be formed by a known method. For example, the dielectric layer may be formed by oxidizing the surface of a metal foil that will form the anode body through chemical conversion treatment.

(Cathode Body)

A metal foil may be used for the cathode body. The metal constituting the metal foil is not particularly limited. Examples of the metal constituting the metal foil include valve metals such as aluminum, tantalum, niobium, and titanium, and alloys of valve metals. Preferred examples are aluminum and an aluminum alloy. The surface of the cathode body may be provided with a chemically converted film, or may be provided with a coating of a metal (dissimilar metal) different from the metal constituting the cathode body, or a coating of a nonmetal. Examples of the dissimilar metal and the nonmetal include metals such as titanium and nonmetals such as carbon.

(Separator)

As the separator, it is possible to use a sheet-shaped material that can be impregnated with an electrolyte. For example, a sheet-shaped material that is insulating and can be impregnated with an electrolyte may be used. The separator may be a woven fabric, a non-woven fabric, or a porous film. Examples of the material of the separator include cellulose, polyethylene terephthalate, polybutylene terephthalate, polyphenylene sulfide, vinylon, nylon, aromatic polyamide, polyimide, polyamide imide, polyetherimide, rayon, and glass.

The basis weight of the separator may be in the range of 10 to 50 $g/m^2$ (e.g., the range of 10 to 30 $g/m^2$). Here, the basis weight is a value measured in accordance with JIS P 8124.

(Exemplary Manufacturing Method of Electrolytic Capacitor)

An exemplary manufacturing method of the electrolytic capacitor according to the present disclosure will now be described. The electrolytic capacitor according to the present disclosure may be manufactured by a method other than the method described below. Note that the matters that have been described for the electrolytic capacitor according to the present disclosure can be applied to the following manufacturing method, and therefore redundant descriptions may be omitted. For example, the constituent elements of the capacitor element have been described above, and therefore redundant descriptions thereof may be omitted. Matters that will be described for the following manufacturing method may be applied to the electrolytic capacitor described above.

A manufacturing method according to the present disclosure includes step (i), step (ii), and step (iii). These steps will now be described. Note that the following describes an exemplary manufacturing method for a case where the electrolyte layer includes a conductive polymer. When the electrolyte layer does not include any conductive polymer, the conductive particles may be attached in advance to the separator, or may be attached to the separator in the capacitor element precursor through impregnation treatment. Alternatively, the conductive particles may be dispersed in the non-aqueous solvent in advance, and the capacitor element precursor may be impregnated with the non-aqueous solvent and the conductive particles simultaneously.

(Step (i))

The step (i) is a step (i) of preparing a capacitor element precursor including an anode body having a dielectric layer on a surface thereof. The step (i) may be a step of forming the capacitor element precursor by a known method.

The step (i) is a step of forming a capacitor element precursor including a foil-shaped anode body having a dielectric layer on a surface thereof, a foil-shaped cathode body, and a separator disposed between the anode body and the cathode body. In this case, as described above, the capacitor element precursor may be a wound capacitor element precursor or a stacked capacitor element precursor. That is, the capacitor element precursor may be a wound body.

(Step (ii))

The step (ii) is a step of forming a polymer layer including a conductive polymer and conductive particles by impregnation treatment such that the polymer layer is adjacent to the dielectric layer. The conductive polymer may be doped with a dopant. In the following, an example in which the conductive polymer is doped with a dopant will be described.

The impregnation treatment in the step (ii) may be impregnation treatment (λ) in which the capacitor element precursor is impregnated with a dispersion including a conductive polymer doped with a dopant and conductive particles. For example, the capacitor element precursor can be impregnated with the dispersion by immersing the capacitor element precursor in the dispersion. By removing (drying) the dispersion medium of the dispersion with which the capacitor element precursor has been impregnated, the polymer layer including the conductive polymer doped with a dopant and the conductive particles can be disposed so as to be adjacent to the dielectric layer. Note that the impregnation treatment (x) may be performed a plurality of times. In that case, a drying step of removing the dispersion medium of the impregnated dispersion may be performed before performing the second and subsequent impregnation treatments (x).

The dispersion medium of the dispersion is not particularly limited, and a known dispersion medium may be used. For example, as the dispersion medium, an aqueous liquid containing water may be used, or water may be used.

By adjusting the mass (content) of the conductive polymer and the mass (content) of the conductive particles in the dispersion, it is possible to adjust the ratio therebetween in the formed electrolyte layer. For example, by increasing the mass (content) of the conductive polymer in the dispersion to be larger than the mass (content) of the conductive particles in the dispersion, it is possible to increase the mass of the conductive polymer included in the electrolyte layer to be larger than the mass of the conductive particles included in the electrolyte layer.

Note that at least a part of conductive particles may be carried in advance on the separator used for forming the capacitor element precursor in the step (i). For example, a separator with the conductive particles carried thereon may be used to form a capacitor element precursor, and, in the impregnation treatment (x), the capacitor element precursor may be impregnated with a dispersion including the conductive polymer doped with a dopant. The dispersion may or may not include the conductive particles. The method for carrying the conductive particles on the separator is not particularly limited. For example, a liquid in which the conductive particles are dispersed may be brought into contact with the separator, and thereafter the separator may be dried.

(Step (iii))

The step (iii) is a step of impregnating the polymer layer formed in the step (ii) with a non-aqueous solvent. Thus, an electrolyte layer including a conductive polymer doped with a dopant, conductive particles, and a non-aqueous solvent is formed. The step (iii) may be a step of impregnating the polymer layer formed in the step (ii) with an electrolytic solution including a non-aqueous solvent. That is, the step (iii) may be a step of impregnating the polymer layer formed in the step (ii) with a liquid component (L).

The impregnation method in the step (iii) is not particularly limited, and a known method may be used. For example, the capacitor element precursor that has been subjected to the step (ii) may be immersed in the non-aqueous solvent (or the electrolytic solution). As the non-aqueous solvent (or the electrolytic solution) used in step (iii), those described above can be applied.

In the manufacturing method according to the present disclosure, the dopant may be a polymeric dopant containing an acidic group, and the step (iii) may be a step of impregnating the polymer layer with an electrolytic solution including a non-aqueous solvent and a base component dissolved in the non-aqueous solvent.

Through the step (iii), a capacitor element is obtained. After the step (iii), an electrolytic capacitor may be produced using the constituent elements obtained in the step (iii). The step used therefor is not particularly limited, and it is possible to use a known method.

In the following, an exemplary electrolytic capacitor according to the present disclosure will be specifically described with reference to the drawings; however, the electrolytic capacitor according to the present disclosure is not limited by the drawings described below. The above-described constituent elements can be applied to constituent elements of the exemplary electrolytic capacitor described below. The constituent elements of the exemplary electrolytic capacitor described below can be modified based on the above description. The matters described below may be applied to the above-described embodiment. The same portions may be denoted by the same reference numerals, and redundant descriptions may be omitted.

Embodiment 1

Figure 2:
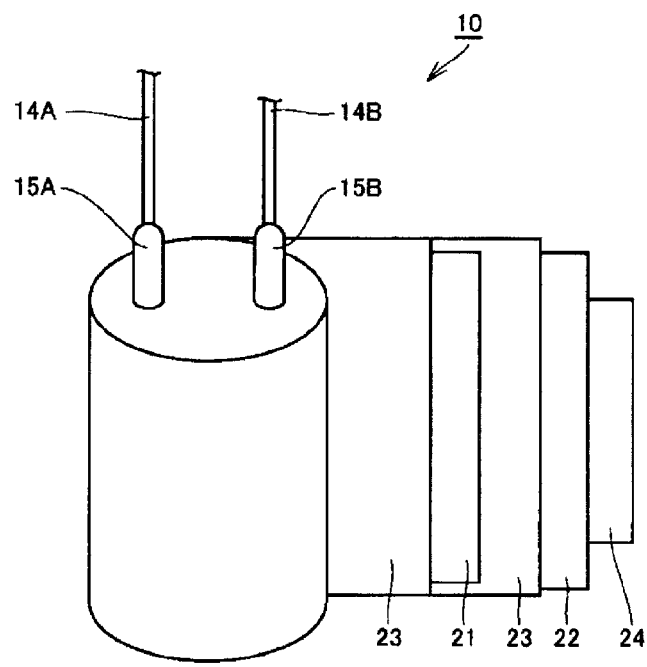
FIG. 2 is a view schematically showing a part of the electrolytic capacitor shown in FIG. 1.

In Embodiment 1, an exemplary electrolytic capacitor according to the present disclosure will be described. The electrolytic capacitor is an electrolytic capacitor including a capacitor element. FIG. 1 schematically shows a cross section of an exemplary electrolytic capacitor 100 according to Embodiment 1. FIG. 2 shows a schematic partial developed view of a capacitor element 10 included in the electrolytic capacitor 100 shown in FIG. 1.

As shown in FIG. 1, the electrolytic capacitor 100 includes the capacitor element 10, a bottomed case 11 that accommodates the capacitor element 10, a sealing member 12 that closes an opening of the bottomed case 11, a seat plate 13 that covers the sealing member 12, lead wires 14A and 14B that are led out from the sealing member 12 and penetrate the seat plate 13, and lead tabs 15A and 15B that connect the lead wires 14A and 14B to electrodes of the capacitor element 10. The capacitor element 10 is accommodated in the bottomed case 11. The bottomed case 11 is drawn inward at a portion near an opening end thereof, and the opening end of the bottomed case 11 is curled so as to crimp the sealing member 12.

Referring to FIG. 2, the capacitor element 10 includes a foil-shaped anode body 21 having a dielectric layer on a surface thereof, a foil-shaped cathode body 22, and a separator 23 and an electrolyte layer (not shown) that are disposed therebetween. The anode body 21 and the cathode body 22 are wound with the separator 23 disposed therebetween. The outermost periphery of the wound body is fixed using winding stop tape 24. Note that FIG. 2 shows the wound body in a partial development before the outermost periphery of the wound body is fixed.

EXAMPLES

Hereinafter, the embodiment according to the present disclosure will be described in further detail by way of examples.

Examples

Production of Capacitor A1

A capacitor A1 is a wound electrolytic capacitor having a rated voltage of 35 V and a rated capacitance of 270 µF. The capacitor A1 was produced according to the following procedure.

Preparation of Cathode Body and Anode Body

As a cathode body, an Al foil (aluminum foil) having a thickness of 70 µm was used. An anode body having a dielectric layer formed on a surface thereof was produced according to the following procedure. First, an Al foil having a thickness of 120 µm was prepared. The Al foil was subjected to direct-current etching treatment, to roughen the surface of the Al foil. Then, the Al foil was subjected to chemical conversion treatment. Specifically, the Al foil was immersed in an aqueous ammonium adipate solution, and subjected to chemical conversion treatment at 70° C. for 30 minutes, under application of a voltage of 50 V to the Al foil, thereby forming a dielectric layer (thickness: about 70 nm) on a surface of the Al foil. In this manner, an anode body having a dielectric layer formed on a surface thereof was obtained. Thereafter, the anode body was cut into a predetermined size, to prepare an anode body of the capacitor A1.

Preparation of PEDOT:PSS Dispersion

A dispersion of a conductive polymer doped with a dopant was prepared by the following method. First, 3,4-ethylenedioxythiophene and polystyrenesulfonic acid (dopant) were dissolved in ion exchanged water, to prepare a mixed solution thereof. To the resultant mixed solution, iron (III) sulfate (oxidizing agent) dissolved in ion exchanged water was added under stirring, to allow polymerization reaction to proceed. After the reaction, the resultant reaction solution was dialyzed to remove the unreacted monomer and excess oxidizing agent. In this manner, a dispersion including poly(3,4-ethylenedioxythiophene) doped with polystyrenesulfonic acid (about 5 mass % relative to poly(3,4-ethylenedioxythiophene) was obtained. In the following, poly(3,4-ethylenedioxythiophene) doped with polystyrenesulfonic acid may be referred to as "PEDOT:PSS".

(Addition of Conductive Particles to PEDOT:PSS Dispersion)

To a dispersion including 2 mass % of the above-described PEDOT:PSS, graphene particles (flaky, average maximum diameter D: 0.4 µm) were added. In this manner, a treating solution A (dispersion) including PEDOT:PSS and conductive particles were prepared. The mass ratio between the PEDOT:PSS and the conductive particles was 75:25.

(Separator)

As the separator, a non-woven fabric (average thickness: 40 µm) was prepared. The non-woven fabric was composed of 50 mass % (25 mass % of polyester fibers, 25 mass % of aramid fibers) of synthetic fibers and 50 mass % of cellulose, and included polyacrylamide as a paper strengthening agent.

(Production of Wound Body)

An anode lead tab and a cathode lead tab having the respective lead wires connected thereto were connected to the anode body and the cathode body, respectively. Then, the anode body and the cathode body were wound with the separator sandwiched therebetween, and an outer surface was fixed using a winding stop tape. As the separator, a non-woven fabric made of cellulose was used. In this manner, a wound body (capacitor element precursor) was produced. The produced wound body was immersed in an ammonium adipate solution, and subjected to chemical conversion treatment again at 70° C. for 60 minutes, while applying a voltage of 50 V to the anode body. Through this chemical conversion treatment, a dielectric layer was formed mainly on an end face of the anode body.

(Formation of Conductive Polymer Layer)

First, the above-described treating solution A was placed in a container. Then, at room temperature and under reduced-pressure atmosphere (40 kPa), the wound body was immersed in the treating solution A in the container for 15 minutes, and thereafter the wound body was withdrawn from the treating solution A. In this manner, the wound body is impregnated with the treating solution A. Then, in a drying furnace, the wound body was dried at 60° C. for 30 minutes, and subsequently at 150° C. for 30 minutes. Thus, the dispersing medium (water) contained in the impregnated treating solution A was removed. In this manner, a conductive polymer layer containing the conductive particles was formed.

(Impregnation of Electrolytic Solution)

The wound body having the conductive polymer layer formed thereon was impregnated with an electrolytic solution at room temperature under atmospheric pressure. As the electrolytic solution, a mixed solution of polyethylene glycol, γ-butyrolactone, sulfolane, and mono(ethyldimethylamine)phthalate (solute) at a mass ratio of polyethylene glycol:γ-butyrolactone:sulfolane:mono(ethyldimethylamine)phthalate=30:30:20:20 was used. In this manner, a capacitor element including an electrolyte layer was obtained. The capacitor element was sealed to complete an electrolytic capacitor. Thereafter, the electrolytic capacitor was subjected to aging treatment at 130° C. for 2 hours, under application of a rated voltage. In this manner, a capacitor A1 was obtained.

Production of Capacitor A2

A capacitor A2 was produced using the same materials and conditions as in the case of the capacitor A1 except that the mass ratio between PEDOT:PSS and the conductive particles was 25:75.

Production of Capacitor A3

A capacitor A3 was produced using the same materials and conditions as in the case of the capacitor A1 except that nickel particles (spherical, average maximum diameter D: 2 µm) were used as the conductive particles in the treating solution A.

Production of Capacitor A4

A capacitor A4 was produced using the same materials and conditions as in the case of the capacitor A3 except that the mass ratio between PEDOT:PSS and the conductive particles was 25:75.

Production of Capacitor A5

A capacitor A5 produced using the same materials and conditions as in the case of the capacitor A3 except that nickel particles (spherical, average maximum diameter D: 10 μm) were used as the conductive particles in the treating solution A, and that the average thickness of the separator was 30 μm.

Production of Capacitor A6

A capacitor A6 was produced using the same materials and conditions as in the case of the capacitor A5 except that the mass ratio between PEDOT:PSS and the conductive particles was 25:75.

Production of Capacitor C1 (Comparative Example)

A capacitor C1 was produced using the same materials and conditions as in the case of the capacitor A1 except that the conductive particles were not used. Accordingly, the conductive polymer layer of the capacitor C1 includes PEDOT:PSS, but does not include the conductive particles.

(Measurement of ESR)

For the electrolytic capacitors produced as described above, the equivalent series resistance (ESR) was measured. The ESR was measured under an environment at 20° C., using an LCR meter for 4-terminal measurement. As the ESR, the initial value after production of the electrolytic capacitor, and the value after the electrolytic capacitor had been left standing at high temperature (at 145° C. for 150 hours and 500 hours) were measured. Then, the relative value of the initial value of ESR was determined using an equation shown below. In addition, as an indicator of long-term characteristics, the ESR change rate of each of the capacitors was determined using an equation shown below. The relative value of the initial value of ESR and the change rate of ESR are relative values with respect to the initial value of ESR of the capacitor C1.

Relative value of initial value of ESR(%)=100×(Initial value of ESR of each capacitor)/(Initial value of ESR of capacitor C1)

ESR change rate (%)=100×(Value of ESR of each capacitor after left standing at high temperature)/(Initial value of ESR of capacitor C1)

(Measurement of Leakage Current)

Under an environment at 20° C., a rated voltage was applied to the electrolytic capacitor, and a leakage current (LC) was measured after an elapse of 2 minutes. As the leakage current, the initial value after production of the electrolytic capacitor, and the value after the electrolytic capacitor had been left standing at high temperature (at 145° C. for 150 hours and 500 hours) were measured. Then, the relative value of the initial value of the leakage current was determined using an equation shown below. In addition, as an indicator of long-term characteristics, the leakage current change rate was determined using an equation shown below. The initial value of the leakage current and the change rate of the leakage current were relative values with respect to the initial value of the leakage current of the capacitor C1.

Relative value of initial value of leakage current (LC)(%)=100×(Initial value of leakage current of each capacitor)/(Initial value of leakage current of capacitor C1)

Leakage current change rate (%)=100×(Value of leakage current of each capacitor after left standing at high temperature)/(Initial value of leakage current of capacitor C1)

Some of the conditions for forming the electrolyte layer of the electrolytic capacitor described above are shown in Table 1. Note that the mass ratio (or content ratio) between the conductive particles and PEDOT:PSS in the formed electrolyte layer can be regarded as being equal to the ratio between their contents in the treating solution. Accordingly, the mass ratio between the conductive particles and PEDOT:PSS in the electrolyte layer was calculated from their contents in the treating solution. In addition, evaluation results of the ESR and leakage current for the electrolytic capacitors described above are shown in Table 2. It is preferable that the ESR and the leakage current are low.

TABLE 1

| | Separator | Conductive particles | | Mass ratio in electrolyte layer | Average maximum diameter |
|---|---|---|---|---|---|
| | Average thickness T (μm) | Material | Average maximum diameter D (μm) | (PEDOT-PSS):Conductive particles | D/Average thickness T |
| A1 | 40 | Graphene | 0.4 | 75:25 | 0.01 |
| A2 | 40 | Graphene | 0.4 | 25:75 | 0.01 |
| A3 | 40 | Nickel | 2 | 75:25 | 0.05 |
| A4 | 40 | Nickel | 2 | 25:75 | 0.05 |
| A5 | 30 | Nickel | 10 | 75:25 | 0.33 |
| A6 | 30 | Nickel | 10 | 25:75 | 0.33 |
| C1 | 40 | No conductive particles | | | |

TABLE 2

| | Relative value of initial value of ESR [%] | ESR change rate [%] | | Relative value of initial value of LC [%] | LC change rate [%] | |
|---|---|---|---|---|---|---|
| | | After 150 hr | After 500 hr | | After 150 hr | After 500 hr |
| A1 | 52 | 63 | 74 | 119 | 136.9 | 160.7 |
| A2 | 22 | 25 | 27 | 135 | 155.3 | 182.3 |
| A3 | 46 | 79 | 110 | 124 | 142.6 | 167.4 |
| A4 | 56 | 69 | 86 | 128 | 147.2 | 172.8 |
| A5 | 60 | 103 | 143 | 107 | 123.1 | 144.5 |
| A6 | 73 | 89 | 112 | 118 | 135.7 | 159.3 |
| C1 | 100 | 119 | 170 | 100 | 114.0 | 132.0 |

As shown in Table 2, the ESRs of the capacitors A1 to A6 were significantly lower than the ESR of the capacitor C1 of a comparative example.

In general, adding conductive particles to a conductive polymer layer leads to an increased leakage current. However, the leakage current was successfully reduced by increasing the value of (Average maximum diameter D/Average thickness T). In addition, the effect of reducing the leakage current by increasing the value of (Average maximum diameter D/Average thickness T) was significant when the amount of the conductive particles was larger than the amount of the conductive polymer.

INDUSTRIAL APPLICABILITY

The present disclosure is applicable to an electrolytic capacitor and a manufacturing method thereof.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

REFERENCE SIGNS LIST

10 . . . Capacitor element
21 . . . Anode body
22 . . . Cathode body
23 . . . Separator
100 . . . Electrolytic capacitor

The invention claimed is:

1. An electrolytic capacitor comprising a capacitor element,
wherein the capacitor element includes an anode body, a dielectric layer formed on a surface of the anode body, a cathode body, and an electrolyte layer and a separator that are disposed between the dielectric layer and the cathode body,
the electrolyte layer includes a non-aqueous solvent and conductive particles,
a ratio D/T of an average maximum diameter D of the conductive particles to an average thickness T of the separator is in a range of 0.01 to 0.9, and
the conductive particles are also disposed throughout the separator.

2. The electrolytic capacitor according to claim 1,
wherein the electrolyte layer further includes a conductive polymer.

3. The electrolytic capacitor according to claim 2,
wherein the electrolyte layer includes a dopant of the conductive polymer.

4. The electrolytic capacitor according to claim 3,
wherein the dopant is a polymeric dopant containing an acidic group, and
the electrolyte layer includes an electrolytic solution including the non-aqueous solvent and a base component dissolved in the non-aqueous solvent.

5. The electrolytic capacitor according to claim 4,
wherein a content of the base component in the electrolytic solution is 0.1 mass % or more and 20 mass % or less.

6. The electrolytic capacitor according to claim 3,
wherein a mass of the conductive particles included in the electrolyte layer is larger than a total mass of the conductive polymer and the dopant included in the electrolyte layer.

7. The electrolytic capacitor according to claim 1,
wherein the conductive particles are particles of a conductive carbon material.

8. The electrolytic capacitor according to claim 1,
wherein the cathode body is a conductive foil, and the conductive particles are metal particles.

9. The electrolytic capacitor according to claim 1,
wherein the ratio D/T is in a range of 0.01 to 0.33.

10. A method for manufacturing an electrolytic capacitor comprising:
a step (i) of forming a capacitor element precursor including a foil-shaped anode body having a dielectric layer on a surface thereof, a foil-shaped cathode body, and a separator disposed between the anode body and the cathode body,
a step (ii) of impregnating the capacitor element precursor with a dispersion including conductive particles and a conductive polymer doped with a dopant to form a polymer layer including the conductive particles and the conductive polymer such that the polymer layer is adjacent to the dielectric layer,
a step (iii) of impregnating the polymer layer with a liquid component containing a non-aqueous solvent to form an electrolyte layer including the non-aqueous solvent and the conductive particles,
wherein a ratio D/T of an average maximum diameter D of the conductive particles to an average thickness T of the separator is in a range of 0.01 to 0.9, and
the content of the liquid component in the electrolyte layer is in the range of 10 to 99.85 mass %.

11. The method according to claim 10,
wherein a mass of the conductive particles included in the electrolyte layer is larger than a total mass of the conductive polymer and the dopant included in the electrolyte layer.

12. The method according to claim 10,
wherein the conductive particles are graphene particles.

13. The method according to claim 10,
wherein the dopant is a polymeric dopant.

14. The method according to claim 10,
wherein the liquid component is an electrolytic solution containing the non-aqueous solvent and a base component dissolved in the non-aqueous solvent.

* * * * *